United States Patent [19]
Harris et al.

[11] 3,930,032
[45] Dec. 30, 1975

[54] BAKING POWDER OF IMPROVED STABILITY AND METHOD OF PRODUCING SAME
[75] Inventors: Norman E. Harris, Waltham; Anthony P. Umina, Hopkinton; Donald E. Westcott, West Acton, all of Mass.
[73] Assignee: The United States of America as represented by the Secretary of the Army, Washington, D.C.
[22] Filed: Feb. 4, 1975
[21] Appl. No.: 546,954

[52] U.S. Cl. .................. 426/97; 106/194; 106/197; 428/403; 427/220; 426/562; 426/443; 426/310
[51] Int. Cl.² ............................................. A23F 1/06
[58] Field of Search ............ 426/562, 563, 551–554, 426/302, 310, 443, 96, 97; 427/220; 106/194, 197; 428/403

[56] References Cited
UNITED STATES PATENTS
856,672  6/1907  Best .................................... 426/562

| 1,286,904 | 12/1918 | Atkinson | 426/562 |
| 2,631,102 | 3/1953 | Hubbard | 426/563 |
| 2,933,396 | 4/1960 | Miller | 426/562 |

FOREIGN PATENTS OR APPLICATIONS

| 474,984 | 1972 | Japan | 426/302 |
| 4,640,354 | 1971 | Japan | 428/403 |
| 469,836 | 1971 | Japan | 428/403 |

*Primary Examiner*—Norman Yudkoff
*Assistant Examiner*—Hiram H. Bernstein
*Attorney, Agent, or Firm*—Nathan Edelberg; Robert P. Gibson; Charles C. Rainey

[57] ABSTRACT

Baking powder of improved stability is produced by coating both the sodium bicarbonate leavening agent and the acidic leavening agent with a coating composition comprising a mixture of cellulose ethers of certain characteristics prior to mixing of the leavening agents to form the baking powder, either with or without redried starch being mixed therewith.

10 Claims, No Drawings

BAKING POWDER OF IMPROVED STABILITY AND METHOD OF PRODUCING SAME

The invention described herein may be manufactured, used, and licensed by or for the Government for governmental purposes without the payment to us of any royalty thereon.

BACKGROUND OF THE INVENTION

This invention relates to a baking powder of improved stability and a method of producing such a baking powder.

In the production of mixes for the preparation of baked products for the civilian market it has been customary to incorporate the leavening agents, such as baking powders comprising sodium bicarbonate and an acidic leavening agent, in the mix along with the other ingredients. This generally works reasonably well when the mix does not have to be stored for long periods of time and when the storage area temperatures are maintained at fairly low levels, as is generally the case with mixes being offered for sale on the civilian market. However, for the Armed Forces, incorporation of the complete baking powder composition in mixes, such as cake mixes, has been found to be unsatisfactory since such mixes for use in the field are often exposed to temperatures of 100°F or higher and storage for periods of six months or more is often required, particularly where military operations in remote parts of the world are involved. One method of overcoming the tendency of the sodium bicarbonate to react prematurely with the moisture and the acidic leavening agent in a cake mix at elevated temperatures and during longterm storage of the cake mixes has been to package the sodium bicarbonate in a moisture impermeable plastic film packet and to enclose this packet in a hermetically-sealed can or other moisture impermeable container along with the cake mix made with all of the other ingredients, including the acidic leavening agent. When the time arrives for preparing a cake, the packet of sodium bicarbonate is opened and the sodium bicarbonate is mixed as well as possible with the other mix ingredients; a batter is then prepared and a cake is baked.

One problem which occurs when military operations are required at higher elevations is that less leavening is needed to produce a desirable bulk volume in a cake because of the lower atmospheric pressure at such higher elevations. A method was devised by two of the inventors of the present application for controlling the leavening of a bakery mix to be used at various elevations. This is described in U.S. Pat. No. 3,632,355 and involves packaging all of an edible bicarbonate for a bakery mix in a separate package from the remaining ingredients, this separate package being provided with indicia imprinted thereon to indicate what portion of the edible bicarbonate should be discarded before mixing of the remainder of the edible bicarbonate with the remaining ingredients of the bakery mix. This has been very successful in preventing excessive leavening action in cake mixes used to produce cakes at higher elevations. However, this procedure has spawned another problem in that excess acidic leavening agent remaining in the cake mix after discarding of some of the edible bicarbonate has resulted in enough off-flavor to cause some decrease in the acceptability of some cakes produced at higher elevations; and the higher the elevation, the greater the acidic off-flavor because of the discarding of greater quantities of the edible bicarbonate before baking of the cake is carried out.

It is very desirable to have a baking powder of high stability wherein the sodium bicarbonate and the acidic leavening agent are thoroughly mixed together in equivalent proportions but will not react prematurely to release carbon dioxide from the sodium bicarbonate. Then if it is necessary to reduce the leavening action for a given quantity of a cake mix at higher altitudes, equivalent quantities of the sodium bicarbonate and the acidic leavening agent may be easily discarded, thus avoiding production of a cake having an excess of acidic leavening agent therein.

An object of the present invention is to provide a baking powder of improved stability which, whether mixed with the remaining ingredients of a bakery mix or maintained separate from such a bakery mix until time for preparing a bakery product arrives, does not react prematurely to release carbon dioxide from the sodium bicarbonate leavening agent.

Another object is to provide a method of producing such a baking powder of improved storage stability.

Other objects and advantages will appear from the following description, and the novel features will be particularly pointed out in connection with the appended claims.

SUMMARY OF THE INVENTION

The invention involves the application of a coating separately to sodium bicarbonate and to an acidic leavening agent, which coating protects both the sodium bicarbonate and the acidic leavening agent and substantially prevents them from reacting with each other when both are incorporated in a cake mix or even when they are mixed together in a baking powder as long as no appreciable amount of moisture is permitted to come in contact with the mixture thereof. In general, it is preferred that the cake mix containing all of the ingredients for the preparation of a cake (except sufficient water), including the coated sodium bicaronate leavening agent and the coated acidic leavening agent, have an average moisture content of less than about 4 percent when it is sealed in a substantially moisture impermeable container prior to storage. It is preferable for a baking powder comprising the coated sodium bicarbonate leavening agent and the coated acidic leavening agent to have an average moisture content of less than about 5 percent when it is sealed in a substantially moisture impermeable packet or other type of containers for storage purposes.

The coating composition for the sodium bicarbonate and for the acidic leavening agent comprises a mixture of certain cellulose ethers and a solvent therefor. The solvent is removed following coating of the sodium bicarbonate or the acidic leavening agent, and the resulting coatings substantially prevent reaction of the sodium bicarbonate with the acidic leavening agent even though they are in relatively close relation in a baking powder or in a complete cake mix containing both, provided the moisture content of the baking powder or the cake mix remains very low, as described above.

DESCRIPTION OF THE PREFERRED EMBODIMENTS

It is to be understood that percentages or ratios stated hereinafter and in the claims refer to percentages or ratios by weight unless otherwise indicated.

The hydroxypropylmethylcellulose employed in the coating composition is characterized by having from about 4 to about 12 percent of 2-hydroxypropyl groups and from about 19 to about 30 percent of methoxyl groups therein. It is described in the "Food Chemicals Codex", First Edition, 1966, Publication 1406 of The National Academy of Sciences - National Research Council, Washington, D.C., at pages 335-6. It is preferred that the hydroxypropylmethylcellulose have a viscosity of from about 40 to about 60 centipoises, determined in accordance with A.S.T.M. Standard D2363-72.

The methylcellulose employed in the coating composition is characterized by having from about 27.5 to about 31.5 percent of methoxyl groups therein. It is described in the above referred to "Food Chemicals Codex" at pages 432-3. It is preferred that the methylcellulose have a viscosity of from about 15 to about 100 centipoises, determined in accordance with A.S.T.M. Standard D1347-72.

The ethylcellulose employed in the coating composition is characterized by having from about 45.0 to about 49.5 percent of ethoxyl groups therein. It is described in the above referred to "Food Chemicals Codex" at pages 254-5. It is preferred that the ethylcellulose have a viscosity of from about 7 to about 100 centipoises, determined in accordance with A.S.T.M. Standard D914-72.

The coating composition comprises a mixture of (1) a cellulose ether which may be either hydroxypropylmethylcellulose, as defined above, or methylcellulose, as defined above, (2) ethylcellulose, as defined above, and (3) a solvent which is compatible with both (1) and (2). It is preferred that the ratio of component (1) to component (2) in the mixture be between about 4:1 and about 1:4 parts, respectively.

The coating composition is conveniently prepared by dissolving 4 grams of component (1) in enough of an ethanol-water mixture containing 80% by volume ethanol and 20% by volume water to make 100 ml of solution and separately dissolving 2 grams of component (2) in enough of an ethanol-water mixture containing 95% by volume ethanol and 5% by volume water to make 100 ml of solution, then mixing together equal volumes of these two solutions to produce the coating composition. This coating composition is applied to the sodium bicarbonate leavening agent in finely divided form in a pan coater, and similarly but separately to the acidic leavening agent in finely divided form, 30 ml of the coating composition being thoroughly mixed with 100 grams of either type of leavening agent over a period of about one hour. In each case, the coated leavening agent is dried at about 75°F. overnight. The resulting coated leavening agent contains about 3 percent of coating and about 97 percent of leavening agent and traces of moisture. Each coated leavening agent is then reduced to powder form. A baking powder is then produced by thoroughly mixing together substantially stoichiometric quantities of the coated sodium bicarbonate and the coated acidic leavening agent. In some cases it is desirable to mix some redried starch with the coated leavening agents of both types in producing a baking powder which exhibits somewhat better stability than that of a baking powder prepared from the coated leavening agents only, although the stability of the latter baking powder is greatly improved over that of baking powder prepared from uncoated leavening agents.

Baking powder prepared as described above may be mixed in the proper proportions with the other ingredients of a cake mix to produce a complete cake mix which has good stability insofar as the retention of leavening power is concerned. However, for possible use at higher elevations, particularly at or above 2000 feet above sea level, it is desirable to package the baking powder in a separate flexible packet which is substantially moisture impermeable and to apply indicia to the packet to indicate what portion of the baking powder to discard prior to mixing of the remaining baking powder with a predetermined quantity of the other ingredients of a cake mix at a given elevation, in accordance with the principle disclosed in U.S. Pat. No. 3,632,355. When this is done, the resulting cake not only has a good bulk volume at any elevation at which it may be prepared but also exhibits better sensory characteristics than cake prepared by discarding only portions of the sodium bicarbonate leavening agent while permitting all of the acidic leavening agent to remain in the cake mix and thus to have insufficient sodium bicarbonate to neutralize substantially all of the acidic leavening agent during baking of the cake.

In general, it is preferable that the cake mix have an average moisture content of less than about 5 percent when it is sealed in a substantially moisture impermeable container prior to storage, whether the baking powder prepared in accordance with the present invention is mixed with the other ingredients of the cake mix to produce a complete cake mix or, on the other hand, the baking powder is packaged spearately from the remaining cake mix ingredients, in which case the baking powder preferably should have an average moisture content of less than about 5 percent.

Having described the invention in general terms above, we will now proceed to illustrate the invention by means of a specific example of the baking powder of the invention and the method of producing the baking powder. It will be understood, of course, that the above-described and other advantages of our invention may also be accomplished by suitable variations of the conditions, about to be set forth below, which are intended to be for illustrative purposes, and not for purposes of limiting the scope of the invention.

EXAMPLE I

A leavening agent coating composition was prepared by dissolving 4 grams of hydroxypropylmethylcellulose, manufactured and marketed by Dow Chemical Co., Midland, Mich., under the tradename "Methocel 60 HG, premium", which has 7 to 12 percent 2-hydroxypropyl groups and 28 to 30 percent methoxyl groups therein and which has a viscosity of about 50 centipoises as determined by A.S.T.M. Standard D2363-72, in enough of an ethanol-water mixture containing 80% by volume ethanol and 20% by volume water to make 100 ml of solution and dissolving 2 grams of ethylcellulose, manufactured and marketed by Dow Chemical Co. under the tradename "Ethocel", which has 45.0 to 49.5 percent ethoxyl groups therein and which has a viscosity of about 10 centipoises as determined by A.S.T.M. Standard D914-72, in enough of an ethanol-water mixture containing 95% by volume ethanol and 5% by volume water to make 100 ml of solution, then mixing together equal volumes of these two solutions to produce a coating composition for application to both the sodium bicarbonate leavening agent and the acidic leavening agent.

The coating composition was applied to powdered sodium bicarbonate by adding 30 ml of the above-described coating composition to 100 grams of bicarbonate of soda, U.S.P. in a Colton laboratory model pan coater and mixing for 1 hour at room temperature. The coated sodium bicarbonate was spread out on a pan and dried overnight at 75°F. in a room at 20% or less relative humidity. The coated sodium bicarbonate was reduced to powder form again. It was found to contain about 3% of the mixture of hydroxypropylmethylcellulose and ethylcellulose, the remainder being sodium bicarbonate.

The coating composition was also applied to an acidic leavening agent manufactured and marketed by Stauffer Chemical Company, Westport, Conn. under the tradename BL-60, which is a mixture of sodium aluminum phosphate and aluminum sulfate anhydrous, in the same manner as that described above with respect to sodium bicarbonate. The resulting coated BL-60 acidic leavening agent was found to contain about 3% of the mixture of hydroxypropylmethylcellulose and ethylcellulose, the remainder being sodium aluminum phosphate and aluminum sulfate anhydrous.

A baking powder (A of Table 1 below) was prepared by thoroughly mixing approximately 10.8 grams each of the coated sodium bicarbonate and the coated BL-60 acidic leavening agent. A second baking powder (B of Table 1) was prepared by thoroughly mixing approximately 10.8 grams each of the coated sodium bicarbonate and the coated BL-60 acidic leavening agent and about 40 grams of Hoosier No. 5 redried starch, which has less than 5% moisture content and is a corn amylose product manufactured and marketed by National Starch & Chemical Corporation, New York, N.Y. A control baking powder (C of Table 1) was prepared by thoroughly mixing approximately 10.8 grams of uncoated sodium bicarbonate with approximately 10.8 grams of uncoated BL-60 acidic leavening agent. Each of the above-described baking powders was hermetically sealed in a can having a rubber septum cemented in place with RTV Sealant, manufactured by Dow Corning Company, to facilitate the taking of samples and the analysis of headspace gases in the cans at various intervals. The cans of the baking powders were stored at 140°F. to determine their relative stabilities, the very high temperature serving to accelerate any tendency of a given baking powder to lose carbon dioxide by reaction of the sodium bicarbonate with the acidic leavening agent. Table 1 shows the results of these headspace gas analyses in terms of carbon dioxide content expressed as percentage by volume. The remaining percentage of headspace gases is represented by nitrogen and oxygen in a ratio of approximately 3.5:1 to 3.8:1.

It is apparent that the baking powder (A) made with coated sodium bicarbonate and coated BL-60 acidic leavening agent was very resistant to loss of carbon dioxide at 140°F. compared with the control baking powder (C) and that the addition of redried starch to the baking powder (A) to produce baking powder (B) resulted in even greater retention of the carbon dioxide in the sodium bicarbonate, with virtually no loss of carbon dioxide for at least 5 days at 140°F. and very little loss of carbon dioxide even after 37 days at 140°F. This represents an extremely severe test of the ability of the sodium bicarbonate coated with the mixture of cellulose ethers in accordance with the invention to retain practically all of its leavening power even in close proximity to an acidic leavening agent which is similarly coated with a mixture of cellulose ethers in accordance with the invention.

A basic white cake mix was prepared as described in Interim Federal Specification N-B-0035E (Army-GL), dated March 8, 1971, entitled "Bakery Mixes, Prepared", except that the sodium bicarbonate leavening agent and the sodium aluminum phosphate and coated monocalcium phosphate acidic leavening agent mixture were omitted. The resulting basic white cake mix had the composition shown in Table 2 in terms of parts by weight:

Table 2

| Ingredient | Parts by weight |
| --- | --- |
| Sucrose | 43.0 |
| Shortening, 100 hour | 9.0 |
| Salt | 0.75 |
| Sodium stearoyl-2-lactylate | 0.40 |
| Mono- and diglycerides | 0.90 |
| Cake flour | 41.4 |
| Dried egg albumen | 1.50 |
| Nonfat dried milk | 2.0 |

Approximately 2 pounds of the basic white cake mix shown in Table 2 were placed in a mixing bowl and approximately 34.2 grams of baking powder of the type of B in Table 1, but which had been stored in a hermetically-sealed can for 5 months at 140°F., were thoroughly mixed with the 2 pounds of basic white cake mix so that approximately 6.0 grams of the coated sodium bicarbonate leavening agent, approximately 6.0 grams of the coated BL-60 acidic leavening agent, and approximately 22.2 grams of the redried starch were mixed with the ingredients of the basic white cake mix. Then 9 fluid ounces of water were added and beaten with the cake mix containing the baking powder for 1 minute at low speed. Then the mixture was beaten for 2 minutes at medium speed. Then 9 fluid ounces more of water were added and the mixture was beaten for 1 minute at low speed and 2 minutes at medium speed. The resulting cake batter was divided into three approximately one pound portions, each of which was placed in a round cake pan and baked at 350°F. for Table 1

| | Percentage of Carbon Dioxide in Headspace Gases After Storage at 140°F. Storage Time (Days) | | | | | | |
| --- | --- | --- | --- | --- | --- | --- | --- |
| | 0 (initial) | 2 | 4 | 5 | 21 | 30 | 37 |
| Baking Powder | | | | | | | |
| A | 0.6 | 0.8 | 1.5 | 1.8 | 3.1 | 3.4 | 3.4 |
| B | 0.1 | 0.1 | 0.1 | 0.1 | 0.3 | 0.4 | 0.5 |
| C | 4.9 | 8.5 | 17.8 | 25.1 | 90.2 | 93.0 | 92.7 |

30–35 minutes in a rotary oven, such as a Middleby-Marshall oven. Two of the cakes were used to determine specific volume and for break tests approximately two hours after baking to allow the cakes to become firm, and the other cake was subjected to sensory testing by a technological panel.

For the purpose of testing the control baking powder of the C type in Table 1, except stored in a hermetically-sealed can for 5 months and at 140°F., approximately 12.0 grams of the C type baking powder mixture, which originally contained sodium bicarbonate leavening agent and BL-60 acidic leavening agent in an approximately 1:1 ratio by weight, were added to approximately 2 pounds of the basic white cake mix shown in Table 2 and thoroughly mixed therewith, after which water was mixed with the resulting cake mix in the same proportions and the same manner as described above for the cake mix containing the B type baking powder to produce a batter from which three cakes were baked in substantially the same manner as the three cakes from the batter containing the B type baking powder. Two of these cakes were used to determine specific volume and for break tests approximately two hours after baking to allow the cakes to become firm, and the other cake was subjected to sensory testing by the same technological panel as that employed for the cake containing the B type baking powder.

The break tests were conducted in accordance with Interim Federal Specification No. N-B-0035E (Army-GL), paragraph 4.3.1.3. The specific volumes of the cakes were determined in accordance with the same specification, paragraph 4.3.1.2. Specific volume is expressed in terms of milliliters per gram.

The sensory tests were conducted by applying a technological scale rating method of evaluating the cakes by a technological taste panel composed of twelve food technologists, the ratings given by the twelve members of the panel being averaged to obtain each of the scale values shown in Table 3, in which the results of all of the above-described tests on the cakes prepared with the type B baking powder and the cakes prepared with the type C (control) baking powder are shown. Analysis of variance (ANOV) or significance results are also shown for the sensory tests. The technological scale rating involves assignment by each member of the technological panel of a rating from 1 to 9, a rating of 1 representing "extremely poor" and a rating of 9 representing "excellent", while ratings in between represent various gradations between these two extremes, a rating of 5.0 being generally considered as borderline in quality. The ratings given are averaged.

the invention, had good specific volumes, passed the break test, and received high technological scale ratings despite the five months of storage of the baking powder at 140°F., a very stringent test of the storage stability of a baking powder; whereas the cakes made from cake mix prepared with Type C (control) baking powder, the leavening ingredients of which were not coated, had very low specific volumes, poor break test properties, and received much lower technological scale ratings from the technological panel with respect to texture, appearance, and flavor, and significantly lower ratings with respect to odor.

It is to be understood that the invention may be carried out employing other types of leavening agents both of the edible bicarbonate or carbonate type and of the acid type. For example, other edible bicarbonates or carbonates, e.g., ammonium bicarbonate, may be coated with a mixture of cellulose ethers, and other edible acids or potentially acidforming materials, e.g., dicalcium phosphate dihydrate, may similarly be coated with mixtures of cellulose ethers and the coated bicarbonates or carbonates mixed with the coated acids or potentially acid-forming materials to produce baking powders which will be highly resistant to reaction during storage at elevated temperatures. Such baking powders may be maintained separately from the other ingredients of bakery mixes or may be mixed with the other ingredients and packaged in a form which requires only the addition of and mixing with water to produce a dough or batter which will be ready for baking on short notice, even after relatively long periods of storage at elevated temperatures, to produce very good cakes or other bakery products, provided they have been maintained at moisture content levels no higher than those of the original bakery mixes and preferably even lower than those of the original bakery mixes if the baking powder is maintained separate therefrom.

Such other highly storage-stable baking powders may also be enclosed in flexible pouches having indicia printed or otherwise applied to the pouches to indicate what portion of the baking powder to discard prior to mixing the remainder of the baking powder with a predetermined quantity of the other ingredients of a cake mix or other bakery mix for use at higher elevations, as indicated above, without encountering an excess of the acid leavening ingredient and a possible off-flavor in the bakery products at higher elevations.

The invention provides baking powders having long-term storage stability at elevated temperatures even as high as 140°F. The particular mixtures of cellulose ethers in the coatings applied to the sodium bicarbonate or other edible bicarbonates or carbonates and to the acidic leavening agent are very effective in preventing premature reaction of the acidic leavening agent Table 3

|  | Break Test | Specific Volume (ml per gram) | Technological Scale Ratings (N=12) | | | | |
| --- | --- | --- | --- | --- | --- | --- | --- |
|  |  |  | Color | Odor | Flavor | Texture | Appearance |
| Cakes from mix prepared with Type B baking powder | Passed | 3.02 | 6.9 | 6.6 | 6.4 | 6.5 | 6.8 |
| Cakes from mix prepared with Type C (control) baking powder | Failed (cake split) | 1.64 | 5.9 | 5.8 | 4.8 | 3.0 | 3.3 |
| Significance Level (ANOV) |  |  | None | 5% | 1% | 1% | 1% |

It is apparent from the results shown in Table 3 that the cakes made from cake mix prepared with Type B baking powder, the preferred form of baking powder of with the leavening agent from which carbon dioxide is released in the leavening process during storage of the baking powders containing such coated leavening agents as long as the moisture content of the baking powder or any bakery mix in which it has been incorporated is kept quite low, preferably below about 5 percent. However, the coatings do not interfere with the leavening action of the acidic leavening agent on the edible bicarbonate or carbonate after considerable water has been mixed with the bakery mix containing the baking powder of the invention, as in preparing a dough or batter, and the dough or batter has been heated to baking temperatures.

If properly prepared and maintained relatively dry during storage, the baking powders of the invention or bakery mixes containing such baking powders have the distinct advantage of maintaining substantially equivalent amounts of acidic leavening agent and edible bicarbonate or carbonate so that even though a selected fraction of the baking powder is omitted from a final mixture of bakery mix ingredients during the preparation of a dough or batter, there will be no appreciable excess of the acidic leavening agent or of the edible bicarbonate or carbonate in the final baked product to impart undesirable off-flavors thereto. This is most advantageous to the Armed Forces, which are required to conduct a wide variety of operations all over the earth, thus encountering requirements for markedly varying the degree of leavening action in any process or recipe for producing leavened food products at widely varying elevations.

The coating composition for the sodium bicarbonate and for the acidic leavening agent of the invention is more effective in protecting both the sodium bicarbonate and the acidic leavening agent from prematurely reacting with each other than either the hydroxypropylmethylcellulose or the methyl cellulose or the ethyl cellulose used individually as coatings for the sodium bicarbonate and the acidic leavening agent.

It will be understood, of course, that various changes in the details and materials which have been described in order to explain the nature of the invention, may be made by those skilled in the art within the principle and scope of the invention.

We claim:

1. A baking powder of improved stability which comprises, a sodium bicarbonate leavening agent and an acidic leavening agent, both types of leavening agent being in the form of finely divided particles, said finely divided particles of both types of leavening agent being coated with a composition comprising a mixture of (1) a cellulose ether selected from the group consisting of hydroxypropylmethylcellulose containing from about 4 to about 12 percent of 2-hydroxypropyl groups and from about 19 to about 30 percent of methoxyl groups and methylcellulose containing from about 27.5 to about 31.5 percent methoxyl groups, (2) ethyl cellulose containing from about 45.0 to about 49.5 percent of ethoxyl groups, and (3) a solvent which is compatible with components (1) and (2), and thereafter freed of said solvent wherein the moisture content of the baking powder is below about 5%.

2. A baking powder of improved stability in accordance with claim 1, wherein redried starch in finely divided form having a moisture content of less than 5 percent is substantially uniformly mixed with the coated finely divided particles of the sodium bicarbonate leavening agent and the coated finely divided particles of the acidic leavening agent.

3. A baking powder of improved stability in accordance with claim 1, wherein the ratio of component (1) to component (2) in said mixture is between about 4:1 and about 1:4 parts.

4. A baking powder of improved stability in accordance with claim 1, wherein said solvent is a mixture of ethanol and water.

5. A baking powder of improved stability in accordance with claim 1, wherein said hydroxypropylmethylcellulose has a viscosity of from about 40 to about 60 centipoises, said methylcellulose has a viscosity of from about 15 to about 100 centipoises, and said cellulose has a viscosity of from about 7 to about 100 centipoises.

6. Method of producing a baking powder of improved stability which comprises, (a) coating finely divided particles of a sodium bicarbonate leavening agent with a coating composition comprising a mixture of (1) a cellulose ether selected from the group consisting of hydroxypropylmethylcellulose containing from about 4 to about 12 percent of 2-hydroxypropyl groups and from about 19 to about 30 percent of methoxyl groups and methylcellulose containing from about 27.5 to about 31.5 percent methoxyl groups, (2) ethyl cellulose containing from about 45.0 to about 49.5 percent of ethoxyl groups, and (3) a solvent which is compatible with components (1) and (2); (b) removing said solvent from the coated sodium bicarbonate leavening agent; (c) coating finely divided particles of an acidic leavening agent with said coating composition; (d) removing said solvent from the coated acidic leavening agent; and (e) mixing the coated sodium bicarbonate leavening agent and the coated acidic leavening agent together in substantially stoichiometric proportions for reacting to release substantially sustantially all of the available carbon dioxide from said sodium bicarbonate leavening agent wherein the moisture content of the baking powder is below about 5%.

7. Method of producing a baking powder of improved stability according to claim 6, wherein redried starch in finely divided form is substantially uniformly mixed with said coated sodium bicarbonate leavening agent and said coated acidic leavening agent.

8. Method of producing a baking powder of improved stability according to claim 6, wherein the ratio of component (1) to component (2) in said mixture is between about 4:1 and about 1:4 parts.

9. Method of producing a baking powder of improved stability according to claim 6, wherein said solvent is a mixture of ethanol and water.

10. Method of producing a baking powder of improved stability according to claim 6, wherein said hydroxypropylmethylcellulose has a viscosity of from about 40 to about 60 centipoises, said methylcellulose has a viscosity of from about 15 to about 100 centipoises, and said ethyl cellulose has a viscosity of from about 7 to about 100 centipoises.

* * * * *